United States Patent [19]

Laghi

[11] Patent Number: 4,900,255

[45] Date of Patent: Feb. 13, 1990

[54] FOR TWO-STAGE QUINCUNX

[76] Inventor: Aldo A. Laghi, P.O. Box 431, Clifton Park, N.Y. 12065

[21] Appl. No.: 294,108

[22] Filed: Jan. 6, 1989

[51] Int. Cl.⁴ .................. G09B 19/00; G09B 23/02
[52] U.S. Cl. ............................ 434/188; 273/120 R; 434/208
[58] Field of Search .................... 434/188, 208; 273/120 R

[56] References Cited

U.S. PATENT DOCUMENTS 1,275,613  8/1918  Sedlak, Jr. .............. 273/120 R
2,789,371  4/1957  Shanhouse ................ 434/188
3,433,484  3/1969  Wallenmeyer ............ 273/120 R

OTHER PUBLICATIONS

C. H. Stoelting Co. Catalog, 1930, p. 1, No. 10160, 8-1930.
Quantum Company Catalog, TP51, 3-1985.
Quantum Company Catalog, "34 New Products" 3-1988.

Primary Examiner—William H. Grieb
Attorney, Agent, or Firm—Schmeiser, Morelle & Watts

[57] ABSTRACT

A two-stage training device for statistical studies permits the demonstration of advanced statistical principles. Balls are dropped from an upper reservoir through a maze of pins which scatters the balls into a histogram having that shape of a normal curve. The balls from individual cells of the histograms are dropped through a second maze of pins into a second set of vertical cells to form a series of histograms. Dropping subsequent sets of balls from many of the upper cells, visually demonstrates, that: "The Sum Of Normal Independent Sets Of Events Is Normal".

18 Claims, 6 Drawing Sheets

FOR TWO-STAGE QUINCUNX

BACKGROUND OF THE INVENTION

1. Field of the Invention

The present invention relates to a training device for demonstrating Statistical principles.

More specifically the present invention relates to a training device used in teaching and practicing Statistical Process Control techniques.

2. Prior Art

The need for demonstrating Statistical principles with a mechanical device goes back to 1873 when Sir Francis Galton made the first Quincunx of his own design.

Subsequently different types of Quincunxes were developed and commercialized.

All of these devices had several limitations:

A. None were ever designed nor constructed that could demonstrate the statistical principle that "The Sum Of Normal Independent Sets Of Disturbances Is Normal".

B. No Two-Stage Quincunx was ever described as a mechanically functional device, due to the relative complexity of the mechanical components that had to be built in a training device.

C. No Two-Stage Quincunx was ever described to handle different color balls nor having rear reservoirs, nor frontal pegs, nor rear pegs for the discrete handling of the histogram cells.

In order to provide background information so that the invention may be completely understood and appreciated in its proper context, reference is made to a number of prior art publications as follows:

Stigler, Stephen M., The History of Statistics; QA 276.15.575 1986; 519.509 85-30-499;

Quantum Company Catalog TP51 (Enclosed),

Quantum Company Catalog "34 New Products" (Enclosed).

SUMMARY OF THE INVENTION

The principal object of the present invention is to provide a multi stage Quincunx for training in advanced Statistical principles.

It is also an object of the present invention to provide such a device which is of simple, inexpensive construction.

A further object is to provide a device which in use, will decrease the fear of inexperienced students to enjoin the ranks of the statisticians.

The foregoing objects can be accomplished by the Quincunx which is the object of this invention:

* This Quincunx features three pinplates, of which, two must be used at the same time; the balls of a sample are drawn from the upper reservoir, through the upper pinplate, and are stopped by the combination of a slide and four frontal pegs, to form a histogram just like in any one-stage quincunx.

* By removing any one of the frontal pegs, the ball of a cell drop through the lower pinplate and distribute themselves on a normal curve. Removing all the frontal pegs, a normal curve results from the mixture of the four normal histograms.

* In exact correspondence of the four frontal pegs, the quincunx object of the present invention, also features four rear-release pegs, which allow to drop the balls from any one of the four cells, into a reservoir to the rear of the lower pinplate, and also allow to put, in their place, in the cell, any number of balls of the same or a different color.

* Balls are supplied in three different colors in order to allow demonstrations of mixtures of different histograms, and to follow the development of distributions from discrete samples.

* The quincunx object of the present invention also features a convenient port, for the removal and the introduction of balls, without having to remove the glass face.

* Another unique feature of the quincunx, object of the present invention, is the two-legged stand, which is made necessary by the increased handling of pegs, balls and pinplates.

BRIEF DESCRIPTION OF THE PHOTOGRAPHS AND THE DRAWINGS

DETAILED DESCRIPTION

Figure 1:
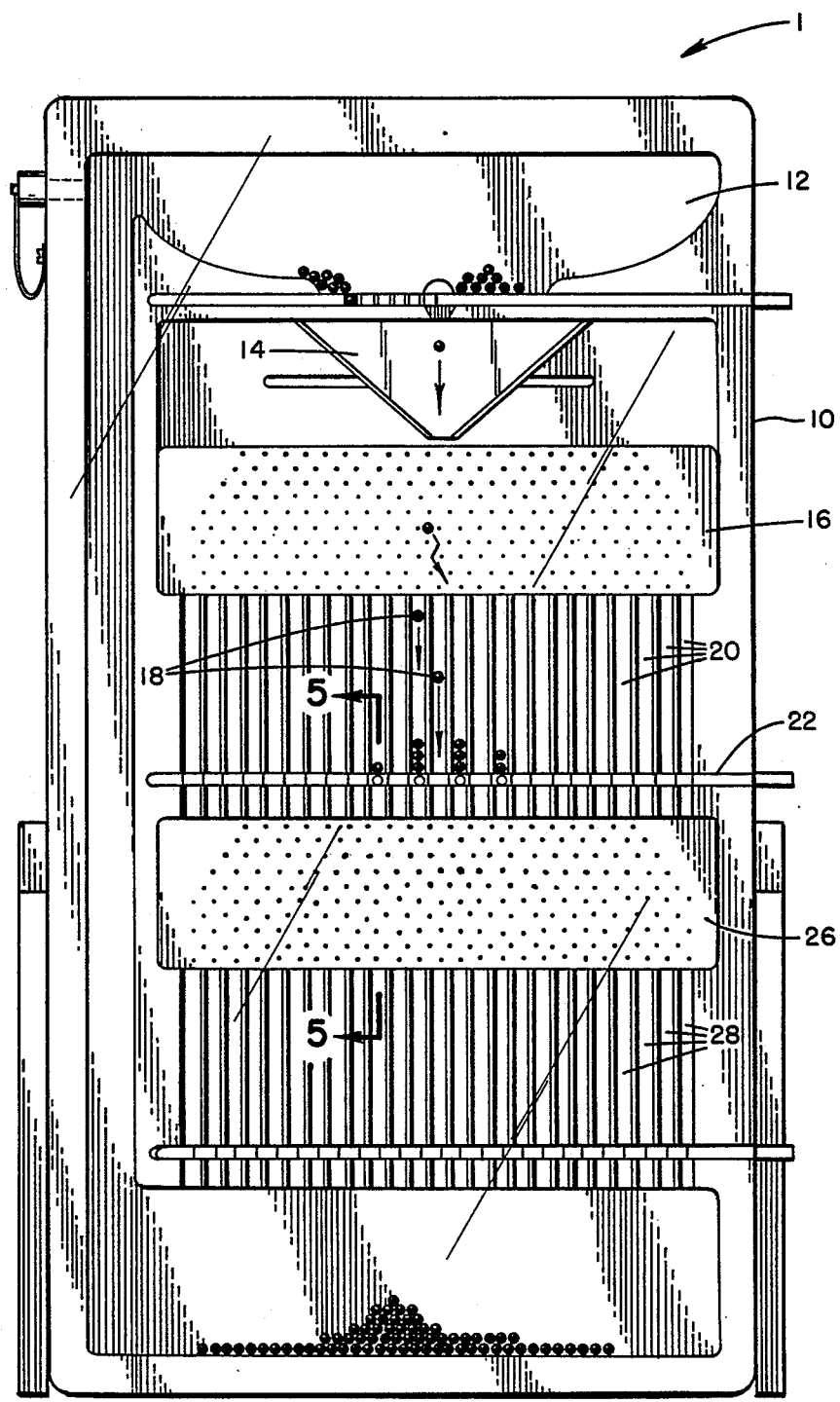
FIG. 1, is a front elevation of a two stage quincunx in accordance with the present invention.

As shown in the drawings and the photographs, the improved two-stage quincunx device 1, in accordance with the present invention, includes the following:

A wooden or plastic support board 10 that is properly machined so that balls can be dropped from an upper reservoir 12, through a directional funnel, funnel shaped conduit 14 into a removable labyrinth of pins (pinplate) 16.

From a number of pinplate the balls 18 drop into a series of compartments defined by vertical grooves 20 which represent the cells of a histogram, such as those customarily used in the teaching of statistics.

Figure 3:
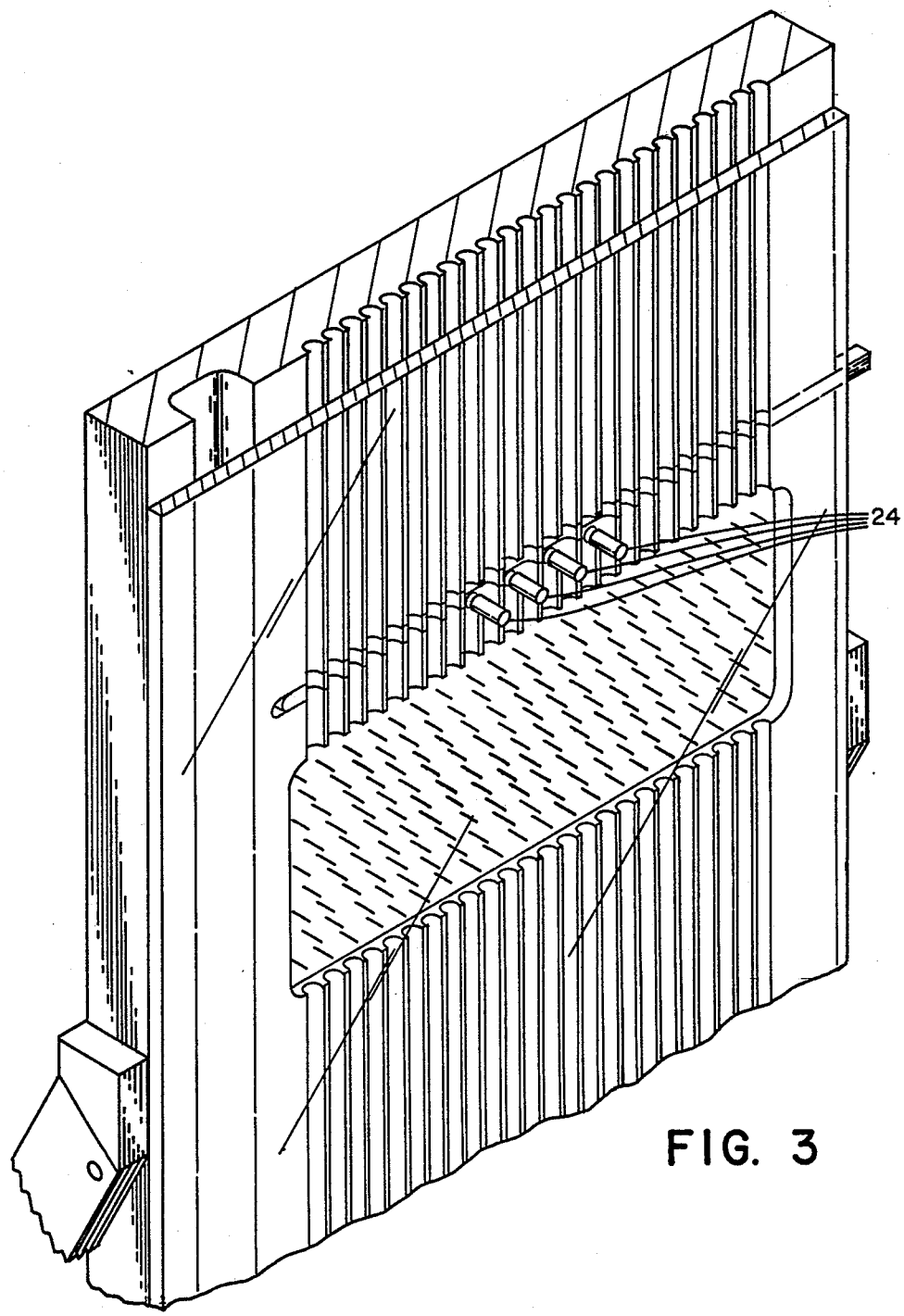
FIG. 3, is an enlarged partial, front view of the central portion of such device.

The balls are retained in the grooves by a combination of a conventional slide catch 22 and by frontal, removable pegs 24 (note FIG. 3).

After a number of balls have been dropped into the grooves to form a normal distribution of a certain standard deviation, any or all of the frontal pegs can be removed to drop the balls into each one of four histogram cells, through a second removable labyrinth of pins (pinplate) 26.

The balls then drop into a second set of vertical grooves 28, and distribute themselves according to a normal distribution again.

Dropping the balls contained in several cells from the upper portion, it is possible to visually demonstrate the all important statistical principle that: "The Sum Of Normal Independent Sets of Distrubances is Normal", and other advanced statistical principles.

Also by releasing the slide 22 shown above the lower pinplate, all of the remaining cells can be dropped at once.

Figure 2:
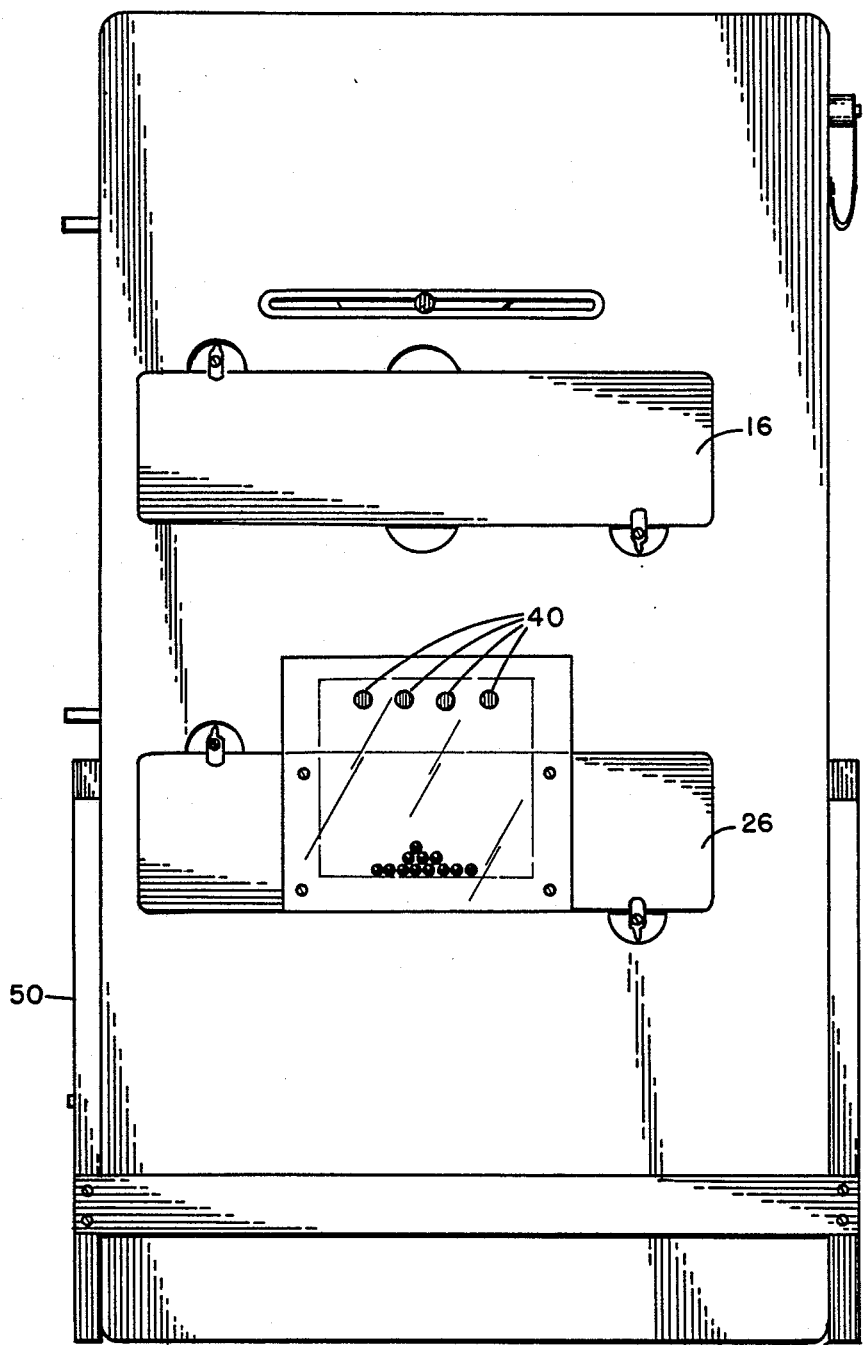
FIG. 2, is a rear elevation of such device.
Figure 4:
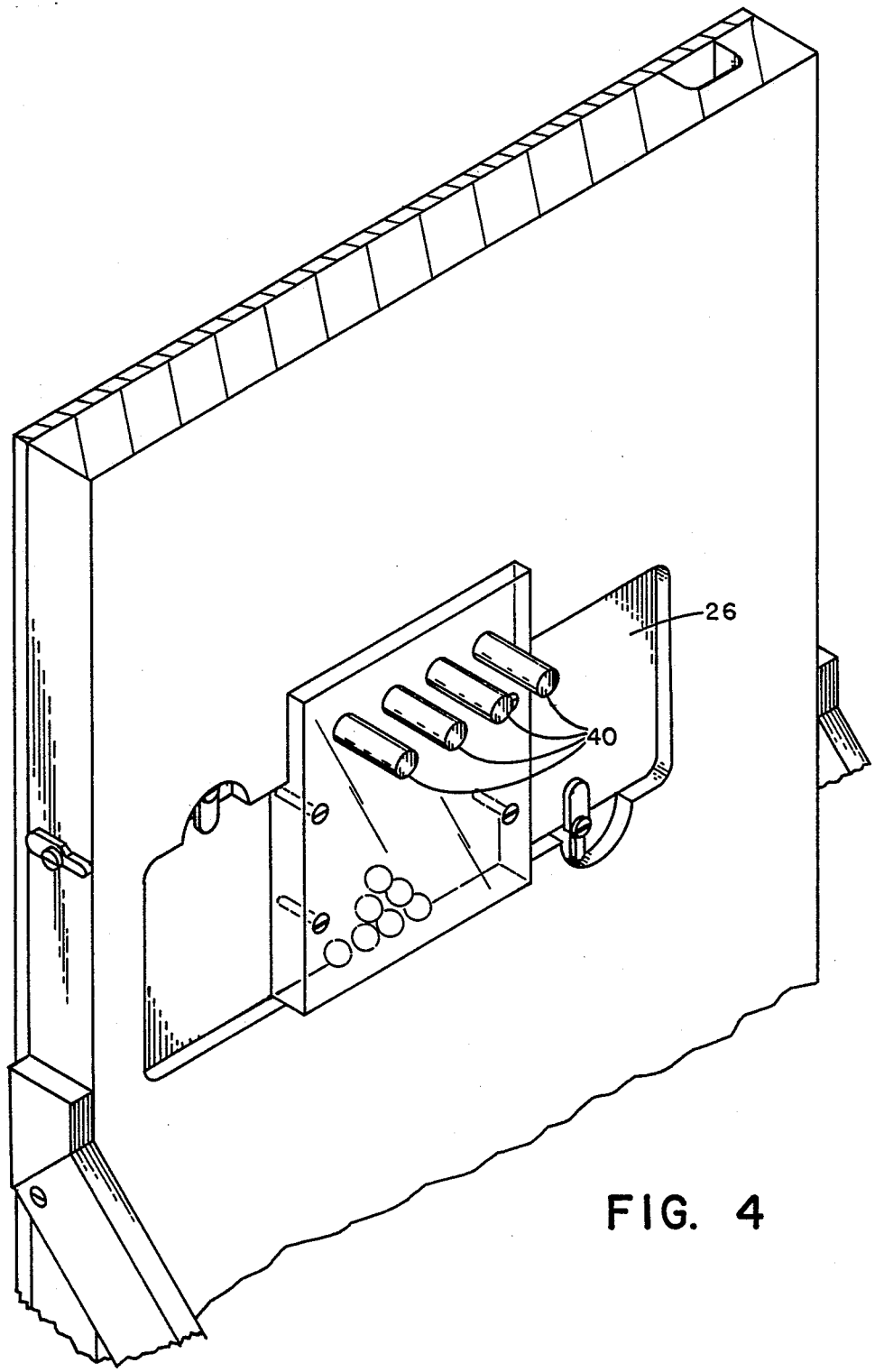
FIG. 4, is an enlarged, fragmentary, rear view of the lower portion of such device.
Figure 5:
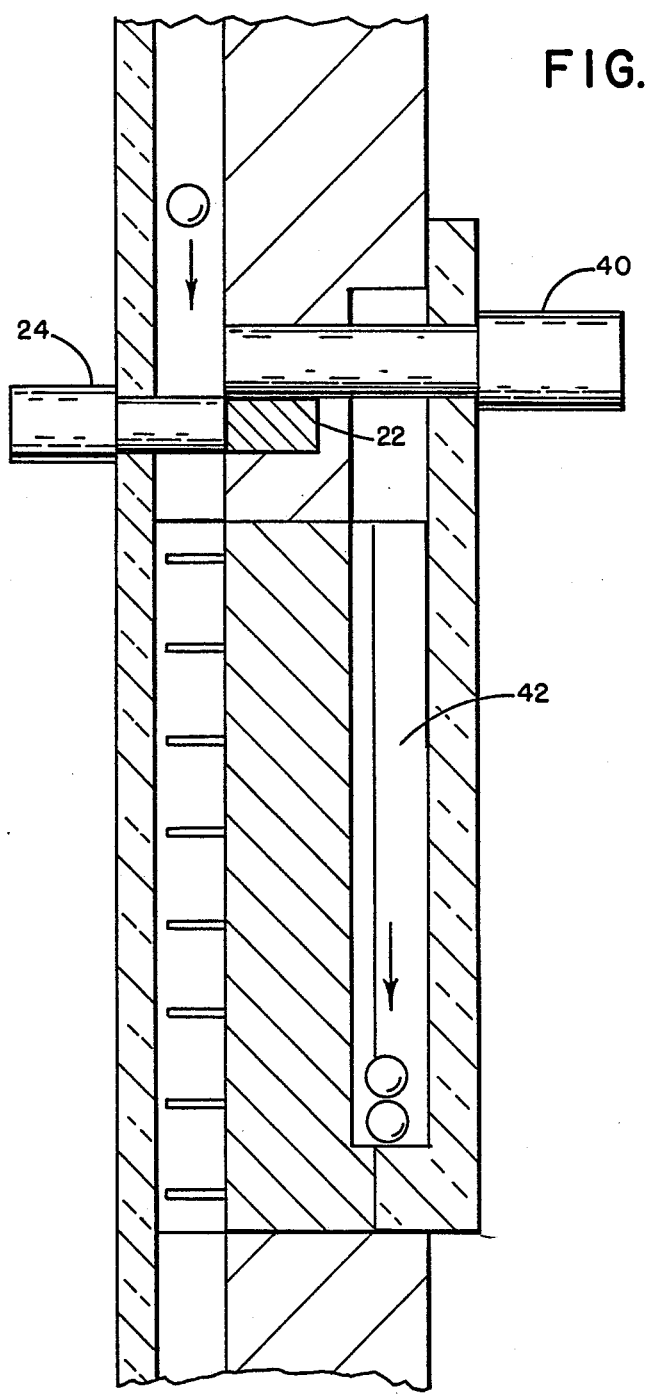
FIG. 5, is a cross section drawing of the center portion of such device.
Figure 6:
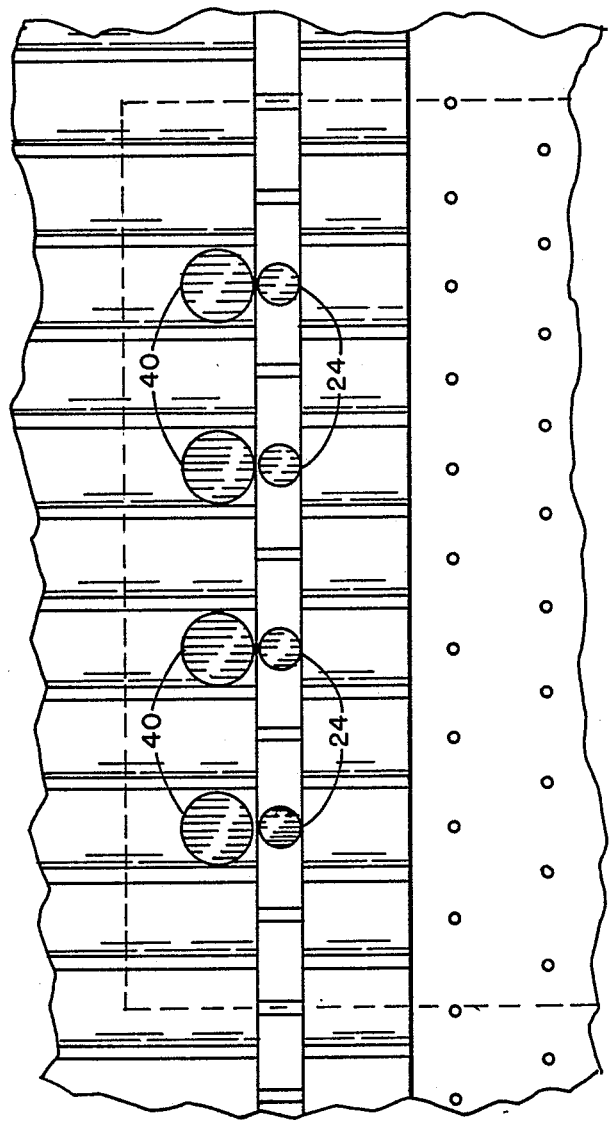
FIG. 6, is a detailed drawing of the front upper portion of such device.
Figure 7:
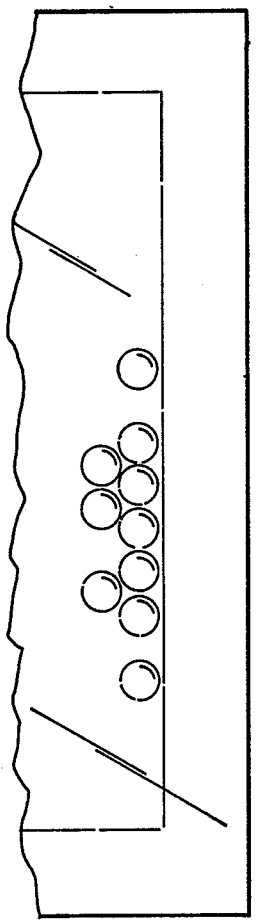
FIG. 7, is a detailed rear view of the lower portion of such device.

Furthermore, before releasing anyone of the frontal pegs, any one of the rear pegs 40 (note FIGS. 2, 4 and 5) can be removed to drop the balls, that had collected in a cell, into a reservoir in the rear of the device. The balls can then be removed by opening a port in the reservoir or by any other conventional reservoir opening means.

Also the balls that have been so removed from a cell, can be replaced with balls of different color; which can be easily introduced, by hand, at the top of each groove 20, by removing the upper pinplate 16.

The replacement of the balls in a cell with the same number of balls but having a different color, permits the studying of patterns of distribution of the balls from the upper grooves 20, into the distribution generated in the lower grooves 28.

The support board 10 is mounted on a stand 50.

The ability of conducting such studies is very valuable in the field of statistics and of teaching of statistics and of statistical process control.

Furthermore all or some of the balls, that are in the quincunx device in accordance with the present invention, can be easily removed and/or replaced by means of a conventional port provided in the frame of the quincunx.

I claim:

1. A training device for use in the teaching and the studying of statistics comprising:
    a support board having a top portion, middle portion and a bottom portion;
    a ball reservoir located on the top portion of the board;
    a conduit means operatively connected to a bottom portion of the ball reservoir;
    a first plurality of spaced pins mounted on said board below said conduit means, said pins extending outwards from a front face of said board, said pin spacing being greater than the diameter of a ball to be used in said device;
    a first plurality of compartments located on said board below said pins whereby a ball can pass through said plurality of pins and fall into one of said compartments;
    a stop means located at a bottom portion of said compartments capable of stopping the downward movement of a ball to be used in said device, said stop means being movable to allow an opening to be formed in at least one of said compartments whereby a ball could exit said at least one compartment;
    a second plurality of spaced pins mounted on said board similarly spaced and extending in the same manner as the first plurality of pins; and
    a second plurality of compartments, said compartments located on a bottom portion of said board below the second plurality of pins whereby a ball can pass through said second plurality of pins and fall into one of said second plurality of compartments.

2. The device of claim 1 whereby the first plurality of pins is mounted on a pinboard, said pinboard being mounted on said support board.

3. The device of claim 1 whereby the second plurality of pins is mounted on a pinboard, said pinboard being mounted on said support board.

4. The device of claim 2 whereby the second plurality of pins is mounted on a pinboard, said pinboard being mounted on said support board.

5. The device of claim 4 wherein said pinboards are removably mounted on said support board.

6. The device of claim 1 wherein said stop means comprises at least one removable peg means located at the bottom of one of said first plurality of compartments whereby removal of said peg means allows any balls which are located in said compartment above said peg means to pass downwardly to said second plurality of pins.

7. The device of claim 6 wherein said stop means comprises a plurality of said removable peg means.

8. The device of claim 7 wherein said stop means comprises 4 removable peg means.

9. The device of claim 1 wherein a bottom portion of at least one of said first plurality of compartments includes a passage and a movable passage blocking means whereby any ball located in said compartment can drop into said passage once the passage blocking means has been moved into a position where the passage is unblocked.

10. The device of claim 9 wherein said passage leads to a ball reservoir located on a rear portion of said support board.

11. The device of claim 9 wherein said passage blocking means comprises a removable peg, said peg extending to a rear surface of said support board and being removable therefrom.

12. The device of claim 9 wherein an upper portion of said at least one compartments is accessible to a user whereby a ball that drops into the passage can be replaced by a ball of a different color.

13. The device of claim 1 also comprising a stand connected to said support board for supporting said board in an inclined position.

14. A statistics training device comprising:
    a support means;
    a ball reservoir means located on an upper portion of said support means;
    a conduit means operatively connected to said reservoir;
    a first pinplate means connected to said support means and located below said conduit means, said pinplate means comprising a plurality of spaced pins extending away from said support means;
    a first plurality of compartments connected to said support means for receiving any balls which pass through said pinplate means;
    a second pinplate means connected to said support means, said second pinplate means located to receive any balls which pass through said first plurality of compartments, said second pinplate means comprising a plurality of spaced pins extending away from said support means; and
    a second plurality of compartments connected to said support means for receiving any balls which pass through said second pinplate means.

15. The device of claim 14 wherein said first and second pinplate means are removable.

16. The device of claim 15 also comprising a stop means located at a bottom portion of each of the first and second pluralities of compartments, said stop mean being capable of stopping any balls located in one of the compartments from leaving said compartment.

17. The device of claim 16 wherein the stop means for the first plurality of compartments is movable to allow an opening to be formed in at least one of said compartment whereby a ball could exit said at least one compartment.

18. The device of claim 17 wherein the stop means for the first plurality of compartments comprises a plurality of removable peg means.

* * * * *